3,334,472
DUST COLLECTOR
Don J. Gonzalez, Valley Station, Ky., assignor to American Air Filter Company, Inc., Louisville, Ky., a corporation of Delaware
Filed Nov. 2, 1965, Ser. No. 506,028
1 Claim. (Cl. 55—294)

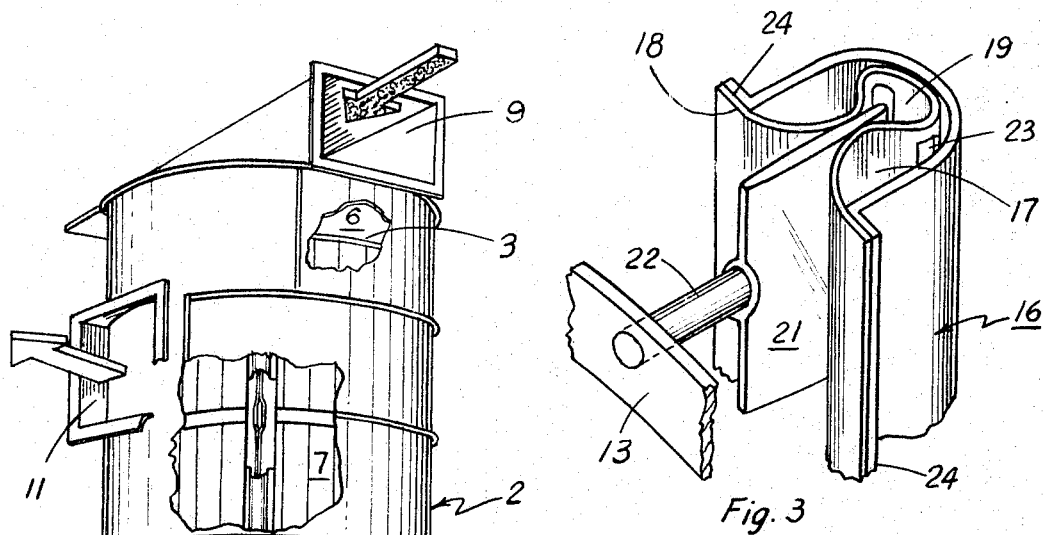
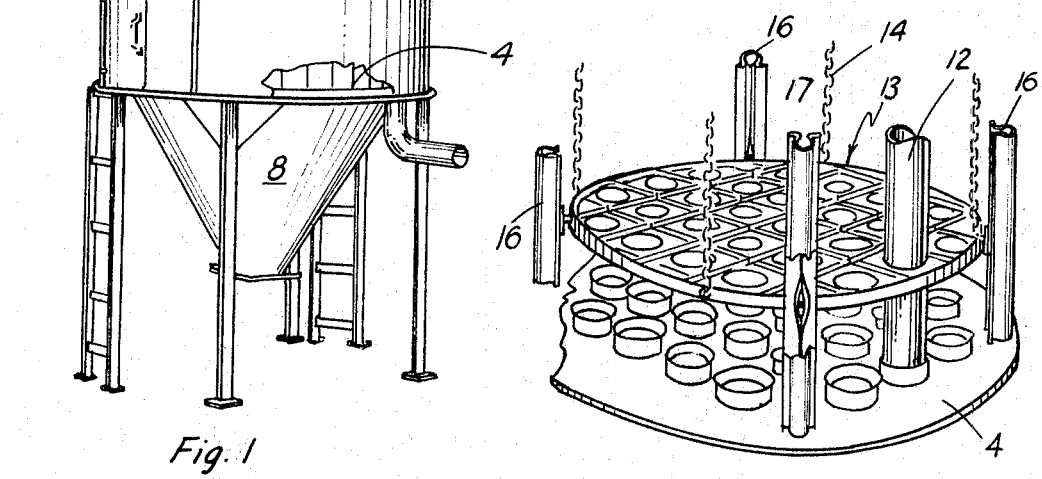
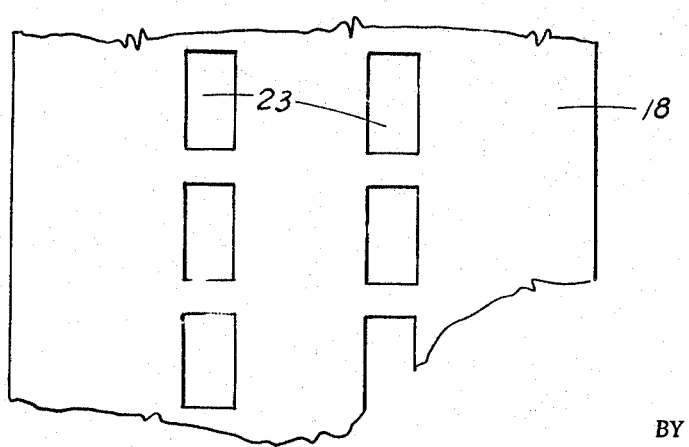
INVENTOR.
Don J. Gonzalez
BY
Ralph C. Brick
ATTORNEY United States Patent Office 3,334,472
Patented Aug. 8, 1967

The present invention relates to dust collectors of the gas permeable tubular fabric type and more particularly to an improved secondary air system for dislodging contaminant particles collected on the interior surfaces of the tubes of such collectors.

It is known in the art of dust collection to pass a dirty gas stream through one or more gas permeable filter tubes extending between a supply header and a dust hopper, the gas to be cleaned flowing from the header through the walls of the tubes with contaminant particles in the gas depositing on the interior surfaces of the tubes or falling into the hopper. To remove dust deposited on such interior surfaces of the tubes, reverse blow ring means is arranged to traverse the tubes periodically, the blow ring means directing a stream of secondary air against the exterior surfaces of the tubes to dislodge contaminants collected on the interior tube surfaces.

Various arrangements have been utilized in the past for conducting the secondary air to the reverse blow ring means. These past arrangements have included rigid vertical air supply columns mounted adjacent the gas permeable tubes to extend along part or all of the length thereof, the supply columns being connected to the blow ring means through a hollow inlet nozzle connected to the blow ring means and arranged to cooperate with the supply column to deliver air therefrom to such blow ring means. Due to the air pressures in the supply columns and the fact that the hollow inlet nozzles must necessarily move relative such supply columns, difficulties have arisen in effecting an efficient seal between the columns and the nozzles cooperating therewith. Frequently, air leakage has occurred and inefficient cleaning of the tubular collectors has resulted.

In accordance with the present invention, a novel arrangement is provided which is economical and straightforward in construction and yet insures efficient cleaning with a minimum of air leakage between the hollow nozzle means and the supply column with which it cooperates. In addition, the present invention provides a structural arrangement which requires a minimum of parts and yet which avoids previously known and undesirable "blowouts" wherein sealing means of a supply column has been caused to reverse itself because of the air pressure induced in such supply column.

Various other features of the present invention will become obvious to one skilled in the art upon reading the disclosure set forth herein.

More particularly, the present invention provides a dust collector comprising: a housing having spaced dirty gas inlet means and clean gas outlet means; vertically extending gas cleaning tube means disposed within the housing in communication with the dirty gas inlet means and the clean gas outlet means whereby dirty gas can be introduced from the dirty gas inlet means into and passed through the tube means to separate contaminant particles therefrom with the clean gas passing to the clean gas outlet means; reverse blow ring frame means adapted to longitudinally traverse the tube means; the frame means having a hollow inlet nozzle means communicating therewith; a air supply conduit means having an elongated slot; elongated flexible flap seal means cooperatively disposed within the slot to receive the inlet nozzle means in slidably sealed engagement therebetween for supplying air through the nozzle means to the reverse blow ring frame means, and restraining means disposed within the conduit means and connected to the flap seal means to restrain the seal means from being reverse blown through the slot of the air supply conduit.

It is to be understood that various changes can be made in the arrangement, form and construction of the apparatus disclosed herein by one skilled in the art without departing from the scope or spirit of the present invention.

Referring to the drawing which discloses one advantageous embodiment of the present invention:

FIGURE 1 is an over-all partially broken away isometric view of a tubular-type dust collector incorporating the improved secondary air system of the present invention;

FIGURE 2 is an enlarged isometric view of a portion of the apparatus of FIGURE 1, disclosing in more detail the reverse blow ring frame means and the air supply conduit system connected thereto;

FIGURE 3 is an even further enlarged portion of one air supply conduit member disclosing the novel, flexible flap seal means of an air supply conduit in cooperative relationship with an inlet nozzle of the reverse blow ring frame; and FIGURE 4 is a still further enlarged view of the seal means in flat, undeveloped form.

Referring to FIGURE 1 of the drawings, dust collector housing 2, the main body portion of which advantageously can be of cylindrical form, is disclosed. Arranged to extend transversely across housing 2 in spaced, parallel relationship to each other are upper and lower header plates 3 and 4, respectively, the lower one 4 being disclosed in more detail in FIGURE 2 of the drawings. The header plates serve to divide the housing into a dirty gas plenum 6 above the upper header plate 3, a gas treating plenum 7 between the spaced plates and a dust hopper 8 below the lower header plate 4. It is to be noted that the dirty gas plenum 6 is provided with a dirty gas inlet 9 and that the gas treating plenum is provided with a spaced clean gas outlet 11.

Mounted in vertically-extending position to connect suitably spaced openings in the upper tube header plate with aligned and similar spaced openings in the lower tube header plate are a series of gas previous fabric tubes 12. The tubes 12 are arranged to pass through apertures in the blow ring frame 13 (FIGURE 2) which frame is moved vertically in a periodic manner along the length of the tube through suitable chain drive mechanisms 14, only a portion of which is disclosed (FIGURE 2). As the frame is moved, high pressure air is discharged at certain preselected intervals against the exterior tube surfaces, dislodging dust from the interior surfaces of the tubes, the dislodged dust falling into hopper 8. It is to be understood that the apparatus so far described is for the most part similar to that disclosed in assignee's Patent No. 2,776,024, issued to Evans E. Fowler on Jan. 1, 1957. Therefore, such apparatus and the operating mechanism associated therewith is not set forth in detail herein.

In accordance with the present invention, a novel arrangement is provided for supplying secondary air to the blow ring frame 13. As can be seen more readily in FIGURES 2 to 4 of the drawing, this arrangement includes spaced, parallel vertically extending gas cleaning air supply conduits 16 which surround blow ring frame 13. Each of the supply conduits 16 has a cross-sectional contour of horseshoe shape so as to provide longitudinally extending slot 17. Arranged to be disposed within longitudinal slot 17 is a seal member in the form of a longitudinally-extending integral flexible member 18. Flexible member 18, which can be of a suitable flexible material of gas impervious nature such as rubber, is of uniform thickness throughout (FIGURE 3). Member 18, which takes the form of a flat sheet prior to assembly has a breadth sized with respect to the internal cross-sectional area of air supply conduit 16 to provide an inner conduit 19 when folded upon itself in air supply conduit 16 so as to be faced upon itself in substantial line contact. Inner conduit 19 serves to receive inlet nozzle 21 connected to blow ring frame 13 through conduit 22. In this connection, it is to be noted that inlet nozzle 21 is in the form of a longiutdinally-extending hollow, knife-like member which extends in sealed relation between the slot-forming folds of seal member 18. It also is to be noted in FIGURE 4 of the drawing that seal member 18 is provided with a plurality of suitably positioned and spaced apertured 23, these apertures serving to supply air from supply conduit 16 to inner conduit 19 when the seal member has been properly mounted in the air conduit. Finally, it is to be noted that longitudinally-extending side edges of seal member 18 can be glued onto the outwardly-turned flanges 24 of air supply conduit 16 or they can be riveted on by some suitable riveting device.

As a result of the aforedescribed arrangement, inner conduit 19 is firmly secured in air supply conduit 16 and is capable of resisting reverse "blow-out" effect, notwithstanding substantial increases of pressure which might be necessary to accomplish proper cleaning of the filter tubes 12. It is to be understood that if desired, that portion of sealing member 18 which forms slotted inner conduit 19 can be further secured to avoid reverse "blow-out" by gluing or riveting the outer wall of inner conduit 19 to inner wall of air supply conduit 16.

The invention claimed is:

A dust collector comprising: a housing having spaced dirty gas inlet means and clean gas outlet means; vertically extending gas pervious cleaning tube means disposed within said housing in communication with said dirty gas inlet means and said clean gas outlet means whereby dirty gas can be introduced from said dirty gas inlet means into and passed through the walls of said tube means to separate contaminant particles therefrom with the clean gas passing to said clean gas outlet means; reverse blow ring frame means adapted to longitudinally traverse said tube means; said frame means having a hollow inlet nozzle means communicating therewith; a longitudinally extending air supply conduit, said air supply conduit having longitudinally extending base and opposed side leg portions to provide an elongated open channel between said side leg portions; a longitudinally extending flexible sheet member of uniform thickness throughout which takes the form of a flat sheet prior to assembly disposed in said channel defined by said air supply conduit with the side edges of said sheet member being fastened to said opposed leg portions, said sheet member having a breadth sized with respect to the internal cross-sectional area of said air supply conduit to permit said sheet member to be faced upon itself in substantial line contact to define within said open channel a fold providing an inner longitudinally extending slotted passage therebetween and a surrounding outer longitudinally extending passage between itself and said air supply conduit, said inner slotted passage receiving said inlet nozzle means in sealing relationship therewith, said sheet member having aperture means therein to place said inner and outer passages in communication with each other during sealing operations with said aperture means remaining open during said operations.

References Cited
UNITED STATES PATENTS

| | | | |
|---|---|---|---|
| 2,758,671 | 8/1956 | Silverman et al. | 55—294 X |
| 2,776,024 | 1/1957 | Fowler | 55—294 |
| 2,798,506 | 7/1957 | Baker et al. | 137—580 |
| 3,012,574 | 12/1961 | Baker et al. | 137—580 |
| 3,173,776 | 3/1965 | Palmore | 55—294 |

FOREIGN PATENTS

| | | |
|---|---|---|
| 979,404 | 1/1965 | Great Britain. |

HARRY B. THORNTON, *Primary Examiner.*

D. TALBERT, *Assistant Examiner.*